Patented Feb. 9, 1954 2,668,778

UNITED STATES PATENT OFFICE 2,668,778

METHOD OF FORMING A PHOTO EMITTER

Ernest A. Taft, Schenectady, N. Y., assignor to General Electric Company, a corporation of New York No Drawing. Application January 10, 1952, Serial No. 265,917

4 Claims. (Cl. 117—33.23)

This invention relates to a photoelectric tube having a high sensitivity in the ultra violet region and substantially no sensitivity to visible light.

The cathodes of many photoelectric tubes are sensitive to light not only in the visible range but also in the ultra violet and infra red. For many of the uses to which photoelectric tubes are utilized, a wide range of sensitivity is not a disadvantage. However, in devices such as mercury vapor detectors, for example, it is desirable that the photoelectric tube utilized therein be insensitive to visible light and yet be very sensitive to light in the ultra violet region, particularly light of 2537 Å. wavelength. In the past, mercury vapor detectors have used photoelectric tubes sensitive to light in the visible region which has been prevented from actuating the tube by means of a shield which is opaque to visible light but transparent to ultra violet. Such shields necessarily decrease the ultra violet radiation reaching the cathode and thus reduce the effectiveness of the tube.

Accordingly, it is an object of this invention to provide a photoelectric tube cathode which is sensitive to light in the ultra violet range while being negligibly sensitive to visible light.

It is another object of the invention to provide a method for producing a photoelectric tube cathode having sensitivity only toward ultra violet light.

Another object of the invention is to produce a photoelectric emitter which is sensitive to ultra violet light only and which has a high quantum efficiency.

Briefly stated, in accordance with one embodiment of my invention, a photoelectric cathode comprises a layer of tellurium combined with either cesium or rubidium substantially in stoichiometric ratio.

The use of cesium and tellurium as a photoelectric emitter has been known previously. British Patent 475,100 to Denisoff and United States Patent 2,218,340 to Maurer both disclose the use of these materials as photo emitters. However, neither of these patents shows cesium and tellurium combined in stoichiometric ratio and neither patent discloses a process for the application of the cesium-tellurium layer which is comparable to that disclosed here. As a result, the photo cathodes of both these patents are sensitive in the visible region as well as the ultra violet.

In accordance with my invention, a conducting base material has a layer of elemental tellurium deposited on it, for example, by evaporation. The material is then placed in a chamber which is evacuated and either cesium vapor or rubidium vapor is admitted and brought into contact with the tellurium. The cesium or rubidium vapor is allowed to react quantitatively with the tellurium until a layer of $Cs_2Te$ or $Rb_2Te$ is formed. The photo surface may be monitored as the reaction progresses and the sensitivity in the ultra violet will go through a maximum. At this point is found the stoichiometric compound of $Cs_2Te$ or $Rb_2Te$. This surface is then in proper condition for use as the cathode of a photoelectric tube.

The sensitivity threshold of the cesium-tellurium compound is about 3200 Å. while that for the rubidium-tellurium compound is about 3,000 Å. From this point the quantum efficiency of both compounds rises rapidly to a maximum of more than 25 percent at a wavelength of 2300 Å.

The sharp cutoff below the visible region together with the high efficiency of the photoelectric tube cathodes produced in accordance with this invention are of particular advantage in instruments such as mercury vapor detectors which require a photoelectric cell very sensitive to the ultra violet light given off by mercury vapor and insensitive to visible light.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. The method of forming a photo emitter which comprises depositing a layer of elemental tellurium on a conducting base material, and contacting said tellurium layer under vacuum with a vapor of a metal selected from the group consisting of cesium and rubidium until said vapor has reacted in stoichiometric quantities with said tellurium.

2. The method of claim 1 wherein the vapor is cesium.

3. The method of claim 1 wherein the vapor is rubidium.

4. A photoelectric cathode formed by the method of claim 1.

ERNEST A. TAFT.

References Cited in the file of this patent

UNITED STATES PATENTS

| Number | Name | Date |
|---|---|---|
| 2,218,340 | Maurer | Oct. 15, 1940 |
| 2,529,888 | Sommer | Nov. 14, 1950 |